US008224907B2

(12) United States Patent
Cohen et al.

(10) Patent No.: US 8,224,907 B2
(45) Date of Patent: Jul. 17, 2012

(54) SYSTEM AND METHOD FOR TRANSMITTING ILLUSORY IDENTIFICATION CHARACTERISTICS

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William H. Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC

( * ) Notice: Subject to any disclaimer, the term of this patent is extended or adjusted under 35 U.S.C. 154(b) by 792 days.

(21) Appl. No.: 12/287,268

(22) Filed: Oct. 7, 2008

(65) Prior Publication Data

US 2010/0040214 A1     Feb. 18, 2010

Related U.S. Application Data

(63) Continuation-in-part of application No. 12/228,664, filed on Aug. 14, 2008, and a continuation-in-part of application No. 12/228,873, filed on Aug. 15, 2008.

(51) Int. Cl.
*G06F 15/16*     (2006.01)
(52) U.S. Cl. ............................ 709/206; 705/39; 709/229
(58) Field of Classification Search ........................ None
See application file for complete search history.

(56) References Cited

U.S. PATENT DOCUMENTS

| | | | |
|---|---|---|---|
| 3,985,972 A | 10/1976 | Rolin et al. | |
| 4,218,738 A | 8/1980 | Matyas et al. | |
| 5,732,138 A | 3/1998 | Noll et al. | |
| 5,751,806 A | 5/1998 | Ryan | |
| 5,835,856 A * | 11/1998 | Patel | 455/406 |
| 5,933,498 A | 8/1999 | Schneck et al. | |
| 6,005,926 A * | 12/1999 | Mashinsky | 379/114.02 |
| 6,026,291 A * | 2/2000 | Carlsson et al. | 455/406 |
| 6,224,109 B1 * | 5/2001 | Yang | 283/77 |
| 6,351,745 B1 * | 2/2002 | Itakura et al. | 1/1 |
| 6,496,931 B1 | 12/2002 | Rajchel et al. | |
| 6,510,236 B1 | 1/2003 | Crane et al. | |
| 6,522,889 B1 | 2/2003 | Aarnio | |
| 6,529,592 B1 * | 3/2003 | Khan | 379/114.01 |
| 6,857,021 B1 | 2/2005 | Schuster et al. | |
| 6,985,569 B2 * | 1/2006 | Baker | 379/126 |
| 6,990,590 B2 | 1/2006 | Hanson et al. | |
| 7,133,837 B1 | 11/2006 | Barnes, Jr. | |
| 7,159,011 B1 | 1/2007 | Knight et al. | |
| 7,203,315 B1 | 4/2007 | Livesay | |
| 7,225,342 B2 | 5/2007 | Takao et al. | |
| 7,275,090 B2 | 9/2007 | Oeda et al. | |
| 7,308,251 B2 | 12/2007 | Karaoguz | |
| 7,310,816 B1 * | 12/2007 | Burns et al. | 726/24 |
| 7,327,312 B1 | 2/2008 | Harris | |

(Continued)

OTHER PUBLICATIONS

"Sometimes, I just don't want them to know it's me calling . . . "; spoofcard.com; pp. 1-2; located at: http://www.spoofcard.com/; printed on Jul. 8, 2010.

(Continued)

*Primary Examiner* — Ian N Moore
*Assistant Examiner* — Dung B Huynh

(57) ABSTRACT

Methods and systems for associating one or more fees with transmissions of one or more illusory identification characteristics are provided.

41 Claims, 10 Drawing Sheets

U.S. PATENT DOCUMENTS

| | | |
|---|---|---|
| 7,334,267 B2 | 2/2008 | Engstrom |
| 7,363,024 B2 | 4/2008 | Jenkins |
| 7,389,541 B2 | 6/2008 | Jia et al. |
| 7,400,878 B2 | 7/2008 | Hassan et al. |
| 7,567,936 B1 | 7/2009 | Peckover et al. |
| 7,614,081 B2 | 11/2009 | Prohel et al. |
| 7,616,943 B2 * | 11/2009 | Oesterling ............... 455/412.1 |
| 7,627,334 B2 | 12/2009 | Cohen et al. |
| 7,630,495 B2 | 12/2009 | Kiiveri et al. |
| 7,634,295 B2 | 12/2009 | Hayaashi et al. |
| 2001/0023432 A1 * | 9/2001 | Council et al. .............. 709/206 |
| 2001/0031631 A1 | 10/2001 | Pitts |
| 2001/0034677 A1 * | 10/2001 | Farhat et al. ................. 705/30 |
| 2001/0034723 A1 | 10/2001 | Subramaniam |
| 2001/0036822 A1 * | 11/2001 | Mead et al. ................. 455/414 |
| 2002/0044067 A1 | 4/2002 | Ilcisin |
| 2002/0099822 A1 | 7/2002 | Rubin et al. |
| 2002/0169664 A1 * | 11/2002 | Walker et al. .................. 705/14 |
| 2002/0174073 A1 | 11/2002 | Nordman et al. |
| 2002/0174363 A1 | 11/2002 | Chefalas et al. |
| 2002/0177449 A1 | 11/2002 | McDonnell et al. |
| 2002/0188562 A1 * | 12/2002 | Igarashi et al. .................. 705/40 |
| 2002/0198777 A1 | 12/2002 | Yuasa |
| 2003/0008672 A1 | 1/2003 | Fujii |
| 2003/0009593 A1 | 1/2003 | Apte |
| 2003/0021413 A1 | 1/2003 | Kiiveri et al. |
| 2003/0086543 A1 * | 5/2003 | Raymond ................ 379/93.02 |
| 2003/0134645 A1 | 7/2003 | Stern et al. |
| 2003/0177357 A1 | 9/2003 | Chamberlin et al. |
| 2003/0217151 A1 | 11/2003 | Roese et al. |
| 2003/0233329 A1 | 12/2003 | Laraki et al. |
| 2004/0015553 A1 | 1/2004 | Griffin et al. |
| 2004/0030932 A1 | 2/2004 | Juels et al. |
| 2004/0064692 A1 | 4/2004 | Kahn et al. |
| 2004/0162904 A1 * | 8/2004 | Eida et al. .................... 709/228 |
| 2004/0178880 A1 | 9/2004 | Meyer et al. |
| 2004/0181683 A1 | 9/2004 | Jia et al. |
| 2004/0203776 A1 | 10/2004 | Jun |
| 2004/0248588 A1 | 12/2004 | Pell et al. |
| 2004/0255127 A1 | 12/2004 | Arnouse |
| 2005/0027618 A1 | 2/2005 | Zucker et al. |
| 2005/0048951 A1 | 3/2005 | Saito |
| 2005/0084100 A1 | 4/2005 | Spies et al. |
| 2005/0091543 A1 | 4/2005 | Holtzman et al. |
| 2005/0114343 A1 | 5/2005 | Wesinger, Jr. et al. |
| 2005/0136903 A1 | 6/2005 | Kashima et al. |
| 2005/0192056 A1 | 9/2005 | Karaki |
| 2005/0198131 A1 | 9/2005 | Appelman et al. |
| 2005/0204037 A1 * | 9/2005 | Levy ........................... 709/225 |
| 2005/0232423 A1 | 10/2005 | Horvitz et al. |
| 2006/0005023 A1 | 1/2006 | Homer et al. |
| 2006/0026438 A1 | 2/2006 | Stern et al. |
| 2006/0031369 A1 * | 2/2006 | Caron et al. ................. 709/207 |
| 2006/0041507 A1 | 2/2006 | Novack et al. |
| 2006/0052095 A1 * | 3/2006 | Vazvan ........................ 455/420 |
| 2006/0079238 A1 | 4/2006 | Liu et al. |
| 2006/0123245 A1 | 6/2006 | Avidan et al. |
| 2006/0167991 A1 | 7/2006 | Heikes et al. |
| 2006/0168059 A1 * | 7/2006 | Chang et al. ................ 709/206 |
| 2006/0248011 A1 | 11/2006 | Hecht-Nielsen et al. |
| 2007/0074046 A1 | 3/2007 | Czajkowski et al. |
| 2007/0208816 A1 * | 9/2007 | Baldwin et al. ............. 709/206 |
| 2007/0208947 A1 | 9/2007 | Sudo et al. |
| 2007/0242827 A1 | 10/2007 | Prafullchandra et al. |
| 2007/0243880 A1 | 10/2007 | Gits et al. |
| 2007/0250571 A1 | 10/2007 | Griffin, Jr. |
| 2007/0250641 A1 | 10/2007 | Flannery et al. |
| 2007/0264974 A1 * | 11/2007 | Frank et al. .................. 455/411 |
| 2007/0277235 A1 | 11/2007 | Barrett et al. |
| 2008/0010665 A1 | 1/2008 | Hinton et al. |
| 2008/0056468 A1 * | 3/2008 | Fredlund et al. .......... 379/93.01 |
| 2008/0071544 A1 | 3/2008 | Beaufays et al. |
| 2008/0086646 A1 | 4/2008 | Pizano |
| 2008/0108324 A1 | 5/2008 | Moshir et al. |
| 2008/0163365 A1 | 7/2008 | Austin et al. |
| 2008/0207329 A1 | 8/2008 | Wallace et al. |
| 2008/0250129 A1 | 10/2008 | Carpenter et al. |
| 2008/0254817 A1 * | 10/2008 | Tornkvist ..................... 455/466 |
| 2008/0267099 A1 | 10/2008 | Curcio et al. |
| 2008/0318598 A1 | 12/2008 | Fry |
| 2009/0005072 A1 | 1/2009 | Forstall et al. |
| 2009/0081989 A1 * | 3/2009 | Wuhrer ........................ 455/406 |
| 2009/0099701 A1 | 4/2009 | Li et al. |
| 2009/0109037 A1 | 4/2009 | Farmer |
| 2009/0170532 A1 | 7/2009 | Lee et al. |
| 2009/0183215 A1 | 7/2009 | McCartie et al. |
| 2009/0195445 A1 | 8/2009 | DeHaas |
| 2009/0215469 A1 | 8/2009 | Fisher et al. |
| 2009/0227268 A1 | 9/2009 | Sorensson et al. |
| 2009/0234764 A1 | 9/2009 | Friesen |
| 2009/0248844 A1 | 10/2009 | Sommer et al. |
| 2009/0275363 A1 * | 11/2009 | McGregor et al. ........... 455/558 |
| 2009/0318112 A1 * | 12/2009 | Vasten ......................... 455/406 |
| 2010/0009657 A1 | 1/2010 | Dingler et al. |
| 2010/0015991 A1 | 1/2010 | Evans et al. |
| 2010/0071035 A1 | 3/2010 | Budko et al. |

OTHER PUBLICATIONS

"Spoof Caller ID with Telespoof.com"; Telespoof.com; Bearing a date of 2010; pp. 1-2; located at: http://www.telespoof.com/; printed on Jul. 8, 2010.

"Spoofkit is the ultimate windup kit available on the net today"; Spoofkit.com; Bearing dates of 2010-2014; pp. 1-6; located at: http://www.spoofkit.com/; printed on Jul. 8, 2010.

* cited by examiner

SYSTEM AND METHOD FOR TRANSMITTING ILLUSORY IDENTIFICATION CHARACTERISTICS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/228,664, entitled System and Method for Transmitting Illusory Identification Characteristics, naming Alexander J. Cohen, Edward K. Y. Jung, Royce A. Levien, Robert W. Lord, Mark A. Malamud, William H. Mangione-Smith, John D. Rinaldo, Jr. and Casey Clarence T. Tegreene as inventors, filed Aug. 14, 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/228,873, entitled System and Method for Transmitting Illusory and Non-Illusory Identification Characteristics, naming Alexander J. Cohen, Edward K. Y. Jung, Royce A. Levien, Robert W. Lord, Mark A. Malamud, William H. Mangione-Smith, John D. Rinaldo, Jr. and Clarence T. Tegreene as inventors, filed Aug. 15, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

Methods and systems for associating fees with transmissions of illusory identification characteristics are provided.

In one aspect, a method includes but is not limited to associating one or more fees with a transmission of one or more illusory identification characteristics associated with one or more first users to one or more second users; and charging the one or more fees to one or more user accounts. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to means for associating one or more fees with a transmission of one or more illusory identification characteristics associated with one or more first users to one or more second users; and means for charging the one or more fees to one or more user accounts. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1:
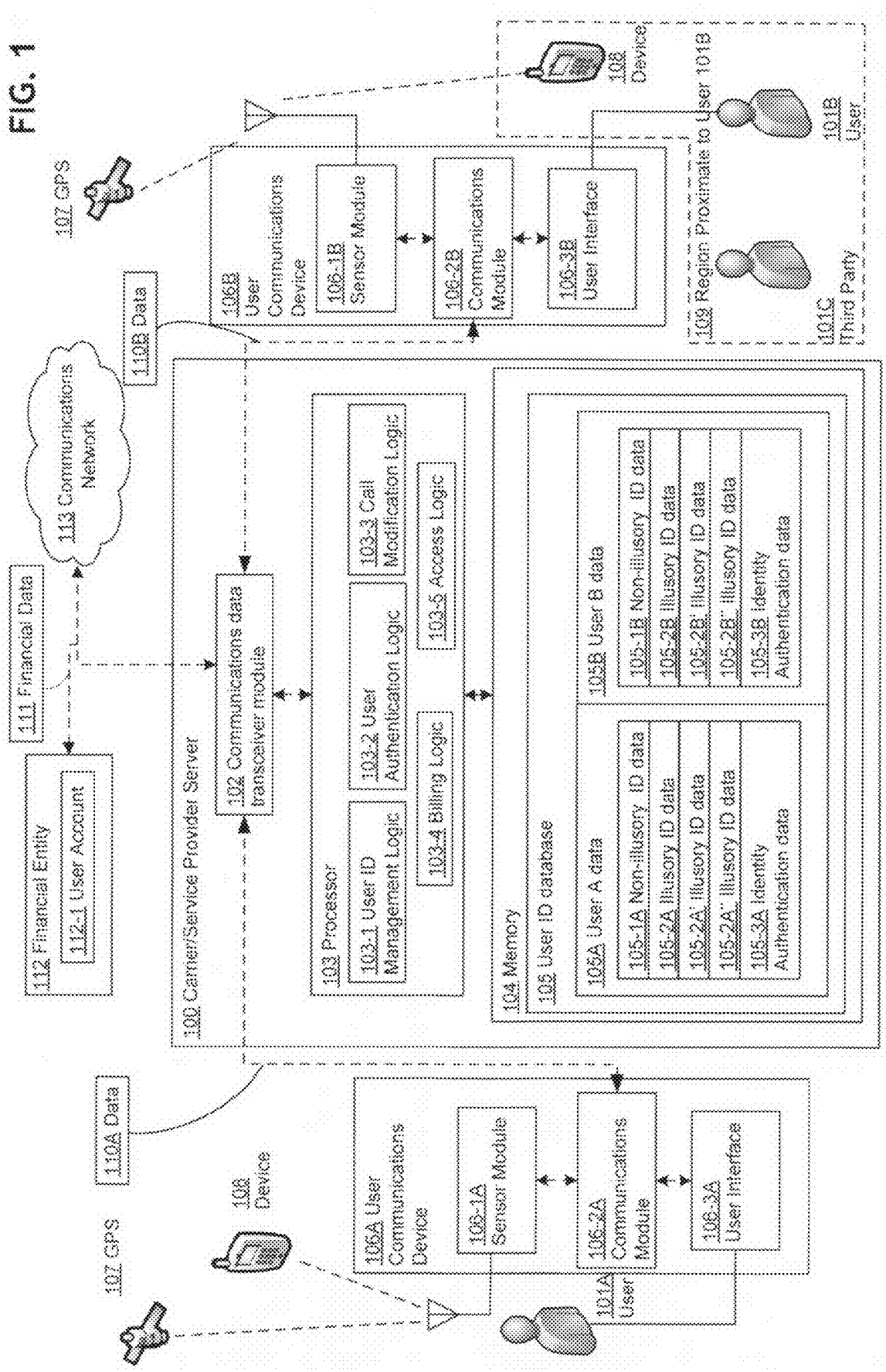
FIG. 1 shows a high-level block diagram of a system for providing illusory identification characteristics.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example environment in which one or more technologies may be implemented. A system for providing illusory identification characteristics may include a carrier/service provider server 100, a user communications device 106A and a user communications device 106B associated with a first user 101A and a second user 101B, respectively (e.g. subscription communications services for the first user 101A and the second user 101B that are activated on user communications device 106A and user communications device 106B respectively).

Although the first user 101A and second user 101B may be shown/described herein as a single illustrated figure, those skilled in the art will appreciate that the first user 101A and second user 101B may be representative of a human user, a robotic user (e.g., computational entity), and/or substantially any combination thereof (e.g., a user may be assisted by one or more robotic agents). The first user 101A and/or the second user 101B may include, but are not limited to, a voicemail service, a text messaging service, a web-based application service, and the like.

The carrier/service provider server 100 may be an integrated or distributed server system associated with one or more communications networks. Numerous types of communications networks 113 may be used. Examples of communications networks may include, but are not limited to, a voice over internet protocol (VoIP) network (e.g. networks maintained by Vonage®, Verizon®, Sprint®), a cellular network (e.g. networks maintained by Verizon®, Sprint®, AT&T®, T-Mobile®), a text messaging network (e.g. an SMS system in GSM), and an e-mail system (e.g. an IMAP, POP3, SMTP, and/or HTTP e-mail server), and the like.

The carrier/service provider server 100 may include a communications data transceiver module 102. Numerous types of communications data transceiver modules 102 may be used. Examples of communications data transceiver modules 102 may include, but are not limited to, a cellular transceiver, a satellite transceiver and a network portal (e.g. a modem linked to an internet service provider).

The carrier/service provider server 100 may include a processor 103. Numerous types of processors 103 may be used (e.g. general purpose processors such those marketed by Intel® and AMD, application specific integrated circuits, and the like). For example, the processor 103 may include, but is not limited to, one or more logic blocks capable of performing one or more computational functions, such as user-ID management logic 103-1, user-authentication logic 103-2, call modification logic 103-3, billing logic 103-4 and/or system access logic 103-5.

The carrier/service provider server 100 may include a memory 104. Numerous types of memory 104 may be used (e.g. RAM, ROM, flash memory, and the like). The memory 104 may include, but is not limited to, a user-ID database 105 including user-ID data for one or more users (e.g. user A data 105A associated with the first user 101A and user B data 105B associated with the second user 101B). A user-ID database item for a user may include one or more fields including user identity data. For example, the user A data 105A may include non-illusory ID data 105-1A, one or more illusory ID data (e.g. illusory ID data 105-2A, 105-2A', 105-2A", etc.), and/or user identity authentication data 105-3A. The user B data 105B may include non-illusory ID data 105-1B, one or more illusory ID data (e.g. illusory ID data 105-2B, 105-2B', 105-2B", etc.), and/or user ID authentication data 105-3B.

The user A data 105A and/or the user B data 105B may include data representing various identification characteristics of one or more users (e.g. first user 101A and/or second user 101B). The identification characteristics of the one or more users may include, but are not limited to, user names, identification numbers, telephone numbers (and/or area codes, international codes, and the like), images, voice prints, locations, ages, sex, gender, physical trait, and the like. Such identification characteristics may be illusory (e.g. the identification characteristic includes one or more fictitious elements with respect to attributes of first user 101A or second user 101B) or non-illusory (e.g. the identification characteristic accurately reflects attributes of the first user 101A or second user 101B).

The first user 101A and the second user 101B may communicate using user communications device 106A and user communications device 106B, respectively. Numerous communications devices may be used. For example, the user communications device 106A and user communications device 106B may include, but are not limited to, a cell phone, satellite phone, Blackberry®, landline phone, a VoIP enabled device and/or computing device (e.g. a desktop or laptop computer). The user communications device 106A and user communications device 106B may include a sensor module 106-1 (e.g. sensor module 106-1A and sensor module 106-1B respectively). Numerous sensor modules may be used. For example, the sensor module 106-1A and/or sensor module 106-1B may include, but is not limited to, one or more of an image capture device (e.g. a digital camera), a microphone, a global positioning system (GPS) receiver, an electromagnetic radiation receiver and/or a biometric sensor (e.g. a voice recognition sensor, a retinal scanner and/or a fingerprint scanner).

The user communications device 106A and user communications device 106B may include a communications module 106-2 (e.g. communications module 106-2A and communications module 106-2B respectively). Numerous communications modules may be used. For example, the communications module 106-2A and/or the communications module 106-2B may include, but are not limited to, one or more of a cellular transceiver, a Bluetooth transceiver, a Wi-Fi transceiver, a satellite transceiver and a network port (e.g. a modem).

The user communications device 106A and user communications device 106B may include a user interface 106-3 (e.g. user interface 106-3A and user interface 106-3B, respectively). Numerous user interfaces may be used. For example, the user interface 106-3A and/or user interface 106-3B may include one or more of a display screen, a touch screen, a keypad, a speaker system and a microphone.

The communications data transceiver module 102 of the carrier/service provider server 100 may transmit financial data 111 to a financial entity 112. Numerous types of financial data 111 may be transmitted. The financial data 111 may include financial transactions (e.g. funds transfers), financial reports (e.g. account statements), financial requests (e.g. credit checks), and the like. Numerous types of financial entities 112 may receive the transmitted financial data 111. The financial entity 112 may include banking systems, credit systems, online payment systems (e.g. PayPal®), bill processing systems, and the like. The financial entity 112 including a user account 112-1 database may be maintained as a component of the carrier/service provider server 100 or as an independent third-party service.

The communications data transceiver module 102 of the carrier/service provider server 100 may transmit financial data 111 to a communications network 113. Numerous types of financial data 111 may be transmitted. The financial data 111 may include financial transactions (e.g. funds transfers), financial reports (e.g. account statements), financial requests (e.g. credit checks), and the like. Numerous types of communications networks 113 may receive the transmitted financial data 111. Networks may include an internet network, an intranet network, and the like. The communications network 113 may include one or more web-servers employing account access programs to provide a user access to financial data 111 regarding at least one user account 112-1.

Figure 2:
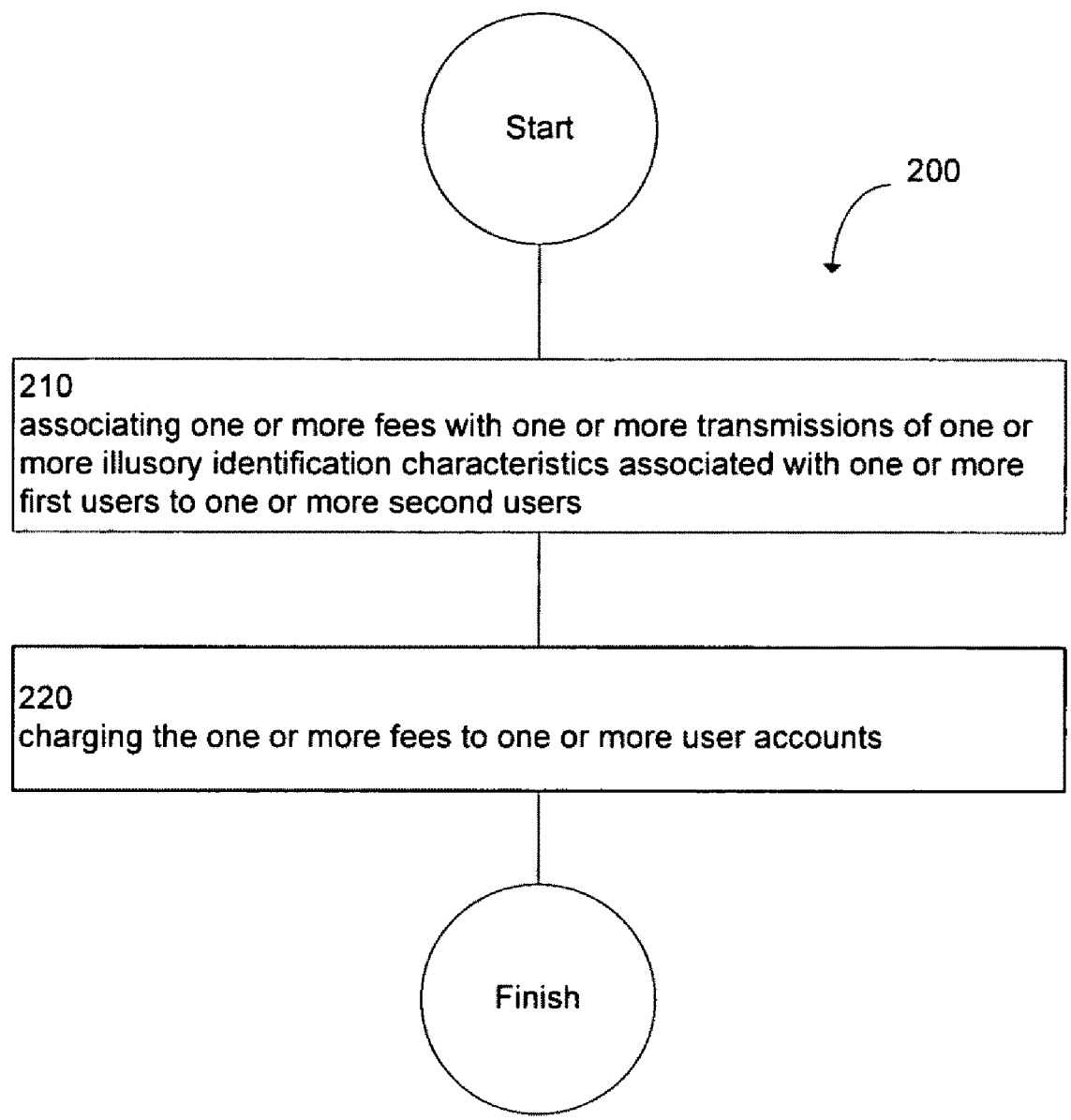
FIG. 2 is a high-level logic flowchart of a process.

FIG. 2 illustrates an operational flow 200 representing example operations related to transmitting illusory identification characteristics. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those that are illustrated, or may be performed concurrently.

After a start operation, the operational flow 200 moves to an operation 210. Operation 210 depicts associating one or more fees with a transmission of one or more illusory identification characteristics associated with one or more first users to one or more second users. For example, as shown in FIG. 1, billing logic 103-4 may monitor data 110B transmitted by the communications data transceiver module 102 to second user 101B for the presence of illusory ID data 105-2A associated with first user 101A. Upon detection of a transmission of illusory ID data 105-2A, billing logic 103-4 may associate a fee (e.g. a monetary fee, a reduction in a number of authorized transmission credits, and the like) with the transmission. The fee may be associated with an amount of data transmitted (e.g. $0.01 per MB of data), number of transmissions (e.g. $1.00 per 100 transmissions), and the like.

Operation 220 depicts charging the one or more fees to one or more user accounts. For example, as shown in FIG. 1, the billing logic 103-4 employing the communications data transceiver module 102 of the carrier/service provider server 100 may charge (e.g., transmit) financial data 111 (e.g. fee data associated with the transmission of illusory ID data 105-2A to second user 101B) to a financial entity 112 (e.g. a checking account associated with first user 101A and/or second user 101B).

Figure 3:
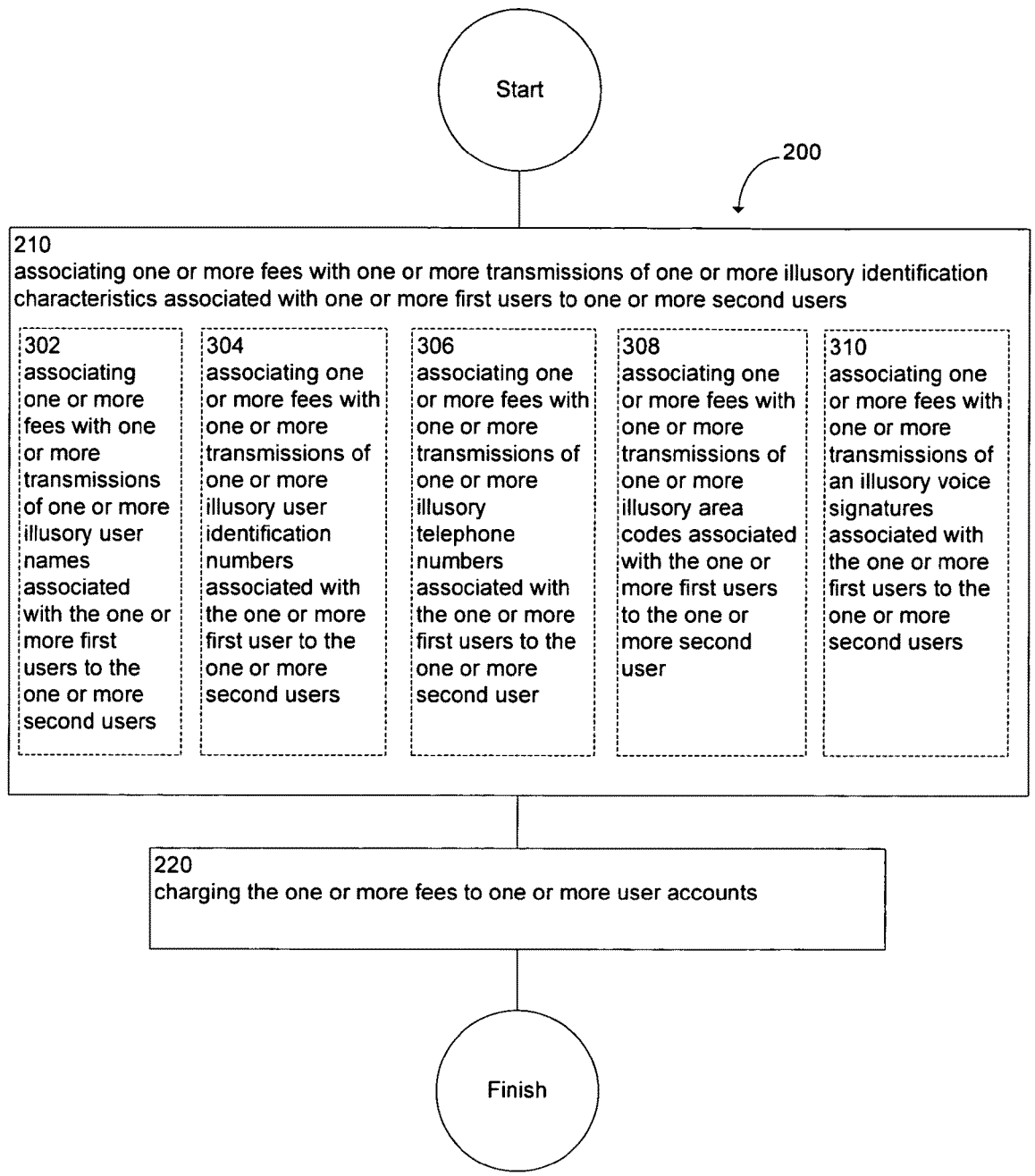
FIG. 3 is a high-level logic flowchart of a process.

FIG. 3 illustrates alternative embodiments of the example operational flow 200 of FIG. 2. FIG. 3 illustrates example embodiments where the operation 210 may include at least one additional operation. Additional operations may include an operation 302, an operation 304, an operation 306, an operation 308 and/or an operation 310.

The operation 302 illustrates associating one or more fees with one or more transmissions of one or more illusory user names associated with the one or more first users to the one or more second users. For example, as shown in FIG. 1, the carrier/service provider server 100 may receive a request from first user 101A to associate an illusory user name maintained as illusory ID data 105-2A associated with first user 101A. The associated illusory user name may be provided as part of data 110B transmitted to second user 101B by the carrier/service provider server 100 so as to disguise the user name of first user 101A. The billing logic 103-4 may detect a transmission of an illusory user name to the second user 101B and associate a fee with the transmission (e.g. a transmission of data 110B including an illusory user name may be associated with a fee of $0.01/transmission).

The operation 304 illustrates associating one or more fees with one or more transmissions of one or more illusory user identification numbers associated with the one or more first users to the one or more second users. For example, as shown in FIG. 1, the carrier/service provider server 100 may receive a request from first user 101A to associate an illusory user identification number (e.g. a social security number) maintained as illusory ID data 105-2A associated with first user 101A. The associated illusory user identification number may be provided as part of data 110B transmitted to the second user 101B by the carrier/service provider server 100 so as to disguise the user identification number of first user 101A. The billing logic 103-4 may detect a transmission of an illusory user identification number to the second user 101B and associate a fee with the transmission (e.g. a transmission of data 110B including an illusory user identification number may be associated with a fee of $0.01/transmission).

The operation 306 illustrates associating one or more fees with one or more transmissions of one or more illusory telephone numbers associated with the one or more first users to the one or more second users. For example, as shown in FIG. 1, the carrier/service provider server 100 may receive a request from first user 101A to associate an illusory user telephone number maintained as illusory ID data 105-2A associated with first user 101A. The associated illusory user telephone number may be provided as part of data 110B transmitted to the second user 101B by the carrier/service provider server 100 so as to disguise the user telephone number of first user 101A. The billing logic 103-4 may detect a transmission of an illusory user telephone number to the second user 101B and associate a fee with the transmission (e.g. a transmission of data 110B including an illusory user telephone number may be associated with a fee of $0.01/transmission).

The operation 308 illustrates associating one or more fees with one or more transmissions of one or more illusory area codes associated with the one or more first users to the one or more second users. For example, as shown in FIG. 1, the carrier/service provider server 100 may receive a request from first user 101A to associate an illusory user area code (e.g. an international dialing code, country codes, city codes, cell phone codes, NANPA codes, ITU-T code, a code established under the North American Numbering Plan, and the like) maintained as illusory ID data 105-2A associated with first user 101A. The associated illusory user area code may be provided as part of data 110B transmitted to the second user 101B by the carrier/service provider server 100 so as to disguise the area code of first user 101A. The billing logic 103-4 may detect a transmission of an illusory area code to the second user 101B and associate a fee with the transmission (e.g. a transmission of data 110B including an illusory area code may be associated with a fee of $0.01/transmission).

The operation 310 illustrates associating one or more fees with one or more transmissions of one or more illusory voice signatures associated with the one or more first users to the one or more second users. For example, as shown in FIG. 1, the carrier/service provider server 100 may receive a request from first user 101A to associate an illusory user voice signature (e.g. a voice signature having an altered pitch, tone, volume relative to the actual voice signature of first user 101A) maintained as illusory ID data 105-2A associated with first user 101A. The associated illusory user voice signature may be provided as part of data 110B transmitted to second user 101B by the carrier/service provider server 100 so as to disguise the voice signature of first user 101A. The billing logic 103-4 may detect a transmission of an illusory voice signature to the second user 101B and associate a fee with the transmission (e.g. a transmission of data 110B including an illusory voice signature may be associated with a fee of $0.01/transmission).

Figure 4:
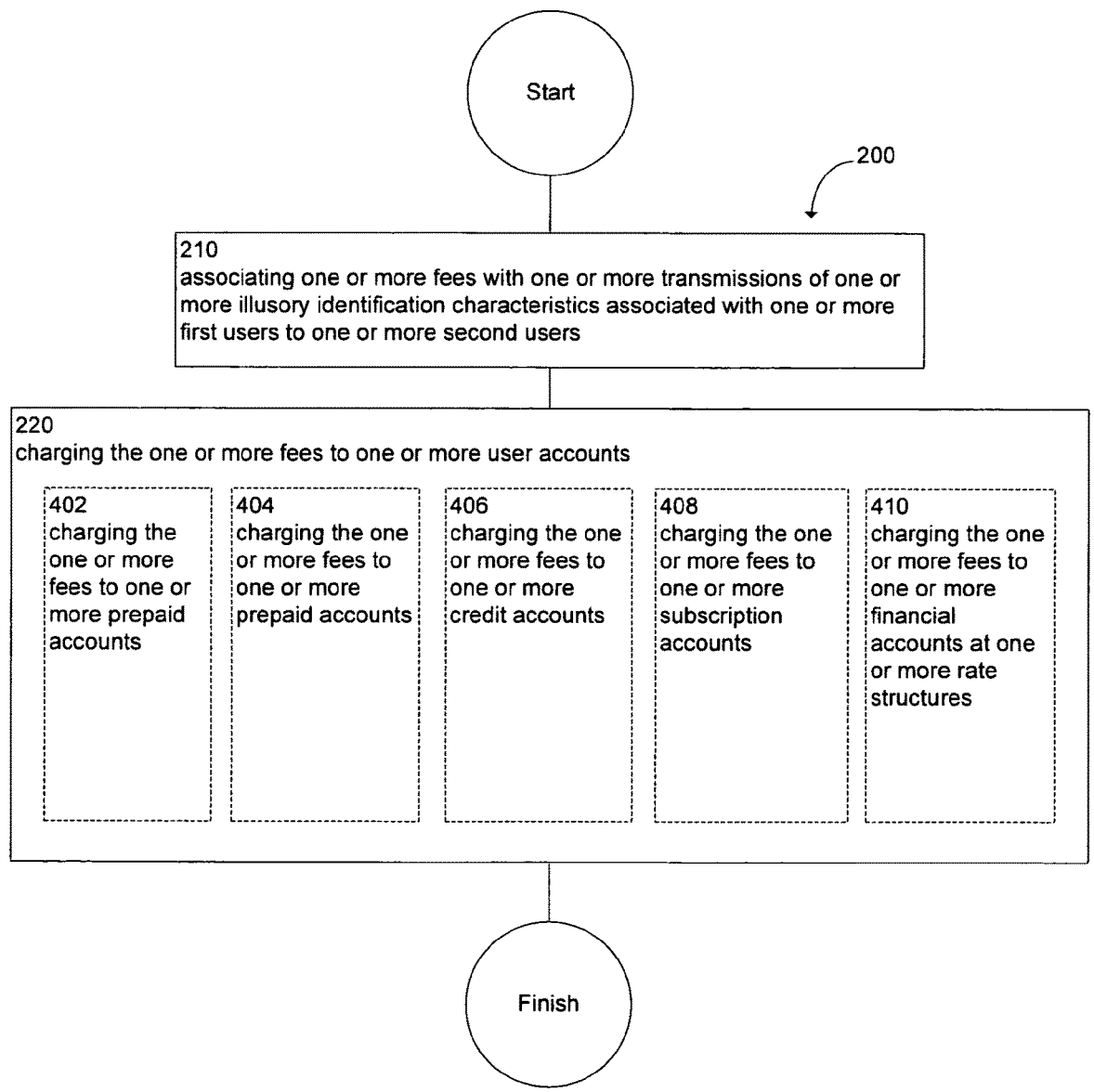
FIG. 4 is a high-level logic flowchart of a process.

FIG. 4 illustrates alternative embodiments of the example operational flow 200 of FIG. 2. FIG. 4 illustrates example embodiments where the operation 220 may include at least one additional operation. Additional operations may include an operation 402, an operation 404, an operation 406, an operation 408 and/or an operation 410.

The operation 402 illustrates charging the one or more fees to one or more prepaid accounts. For example, as shown in FIG. 1, the billing logic 103-4 may detect a transmission of illusory ID data 105-2A to the second user 101B and associate a fee with the transmission (e.g. a transmission of data 110B including an illusory identification characteristic may be associated with a fee of $0.01/transmission). The communications data transceiver module 102 of the carrier/service provider server 100 may transmit financial data 111 including fee data associated with transmission of the illusory ID data 105-2A to the second user 101B to a financial entity 112. The financial entity 112 may maintain at least one user account 112-1 associated with the first user 101A and/or second user 101B. The fee may be assessed against funds or credits maintained in the user account 112-1. The user account 112-1 may be a prepaid account where the first user 101A and/or second user 101B may make prepayment deposits for illusory identification transmission services. Further, the communications data transceiver module 102 may transmit illusory ID data 105-2A to the second user 101B if a fee associated with a prospective transmission does not exceed a prepaid fund amount in the user account 112-1. Should a fee associated with a prospective transmission of illusory ID data 105-2A to the second user 101B exceed a prepaid fund amount in the prepaid user account 112-1, the billing logic 103-4 may restrict the transmission of illusory ID data 105-2A to the second user 101B.

The operation 404 illustrates charging the one or more fees to one or more banking accounts. For example, as shown in FIG. 1, the billing logic 103-4 may detect a transmission of illusory ID data 105-2A to the second user 101B and associate a fee with the transmission (e.g. a transmission of data 110B including an illusory identification characteristic may be associated with a fee of $0.01/transmission). The communications data transceiver module 102 of the carrier/service provider server 100 may transmit financial data 111 including fee data associated with transmission of the illusory ID data 105-2A to the second user 101B to a financial entity 112. The financial entity 112 may maintain at least one user account 112-1 associated with the first user 101A and/or second user 101B. The fee may be assessed against funds or credits maintained in the user account 112-1. The user account 112-1 may be a banking account (e.g. a checking account, savings account, and the like). The communications data transceiver module 102 may initiate an electronic funds transfer (EFT) (e.g. a wire transfer, a direct withdrawal, and the like) directed to a user account 112-1.

The operation 406 illustrates charging the one or more fees to one or more credit accounts. For example, as shown in FIG. 1, the billing logic 103-4 may detect a transmission of illusory ID data 105-2A to the second user 101B and associate a fee with the transmission (e.g. a transmission of data 110B including an illusory identification characteristic may be associated with a fee of $0.01/transmission). The communications data transceiver module 102 of the carrier/service provider server 100 may transmit financial data 111 including fee data associated with transmission of the illusory ID data 105-2A to the second user 101B to a financial entity 112. The financial entity 112 may maintain at least one user account 112-1 associated with the first user 101A and/or second user 101B. The fee may be assessed against funds or credits maintained in the user account 112-1. The user account 112-1 may be a credit account (e.g. credit card, a line of credit, a loan account, and the like). The communications data transceiver module 102 may transfer financial data 111 representing the fee to the financial entity 112 which may be reflected as a charge to the user account 112-1 which may be billed to at least one of the first user 101A and/or second user 101B on a periodic basis.

The operation 408 illustrates charging the one or more fees to one or more subscription accounts. For example, as shown in FIG. 1, the billing logic 103-4 may detect a transmission of illusory ID data 105-2A to the second user 101B and associate a fee with the transmission (e.g. a transmission of data 110B including an illusory identification characteristic may be associated with a fee of $0.01/transmission). The communications data transceiver module 102 of the carrier/service provider server 100 may transmit financial data 111 including fee data associated with transmission of the illusory ID data 105-2A to the second user 101B to a financial entity 112. The financial entity 112 may maintain at least one user account 112-1 associated with the first user 101A and/or second user 101B. The fee may be assessed against funds or credits maintained in the user account 112-1. The user account 112-1 may be a subscription account (e.g. an account maintaining a number of authorized transmissions per a subscription agreement). The communications data transceiver module 102 may transfer financial data 111 representing an instruction to the financial entity 112 to reduce a number of authorized transmission credits maintained in user account 112-1.

The operation 410 illustrates charging the one or more fees to one or more financial accounts at one or more rate structures. For example, as shown in FIG. 1, the billing logic 103-4 may detect a transmission of illusory ID data 105-2A to the second user 101B and associate a fee with the transmission (e.g. a transmission of data 110B including an illusory identification characteristic may be associated with a fee of $0.01/transmission). The communications data transceiver module 102 of the carrier/service provider server 100 may transmit financial data 111 including fee data associated with transmission of the illusory ID data 105-2A to the second user 101B to a financial entity 112. The financial entity 112 may maintain at least one user account 112-1 associated with the first user 101A and/or second user 101B. The fee may be assessed against funds or credits maintained in the user account 112-1. The financial data 111 may include one or more fees charged at one or more rate structures. For example, a first fee rate may be charged for a first number of transmissions of illusory ID data 105-2A to second user 101B (e.g. the first 50 transmissions are at a rate of $0.01 per transmission) while a second fee rate may be charged for a second number of transmissions (e.g. each transmission in excess of 50 is charged at a rate of $0.015 per transmission). Alternately, a first fee rate may be charged for transmission of illusory ID data 105-2A to second user 101B while a second fee rate may be charged for transmission of illusory ID data 105-2A' to second user 101B.

Figure 5:
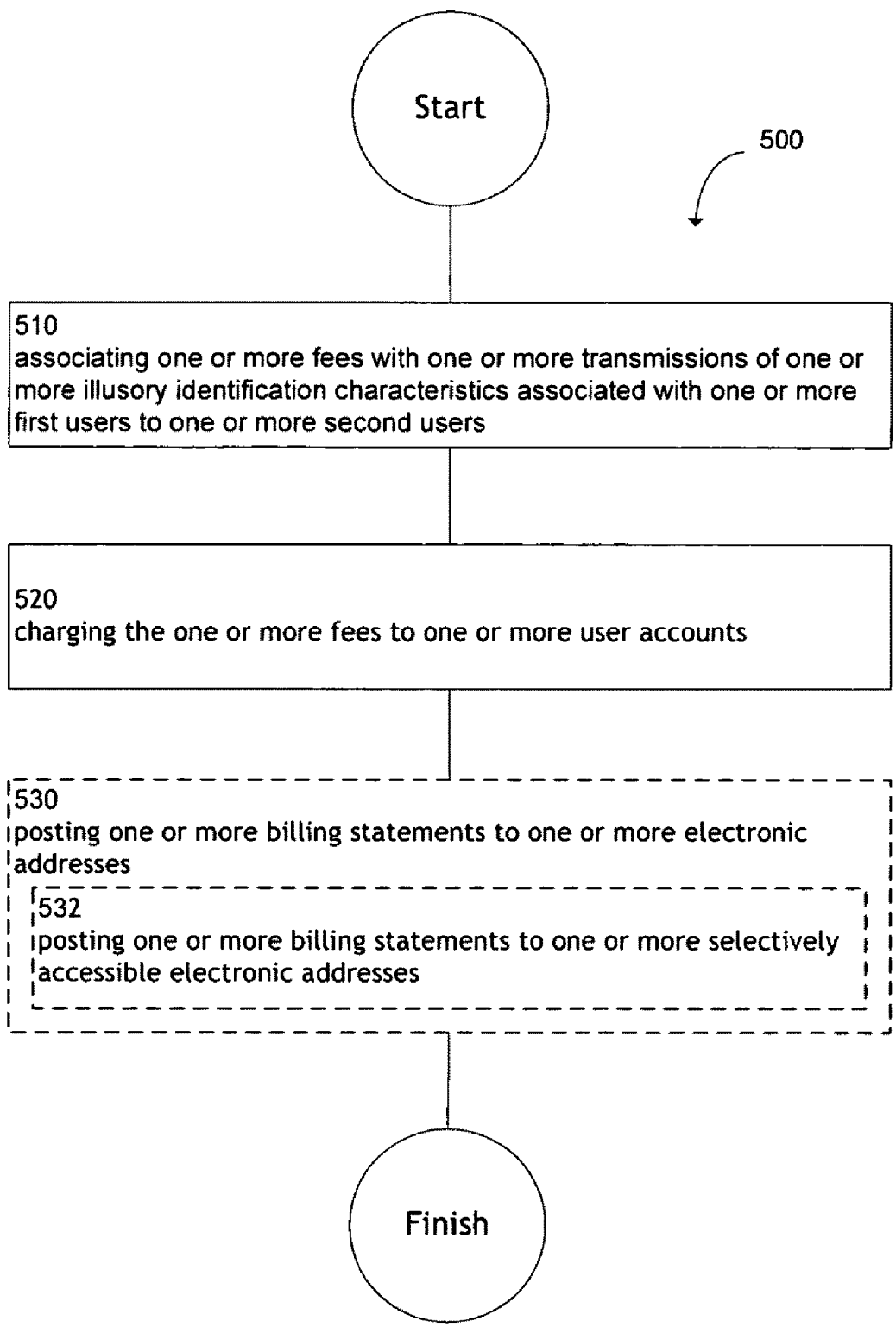
FIG. 5 is a high-level logic flowchart of a process.

FIG. 5 illustrates an operational flow 500 representing example operations related to authenticating a user identity. Operations 510 and 520 of operational flow 500 may be similar to those of operations 210 and 220 respectively, as referenced above with respect operational flow 200. Additional operations may include an operation 530, and/or an operation 532.

The operation 530 illustrates posting one or more billing statements to one or more electronic addresses. For example, as shown in FIG. 1, communications data transceiver module 102 of the carrier/service provider server 100 may transmit billing statements to a communications network 113. The communications network 113 may include one or more web-servers hosting one or more electronic addresses. The web-servers may be user-accessible so as to provide access to files posted to the electronic addresses. Billing statement files may be posted to the electronic addresses in numerous formats. The billing statements may be configured as one or more html files, xml files, PDF files, and the like.

The operation 532 illustrates posting one or more billing statements to one or more selectively accessible electronic addresses. For example, as shown in FIG. 1, communications data transceiver module 102 of the carrier/service provider server 100 may transmit billing statements to a communications network 113. The communications network 113 may include one or more web-servers hosting one or more electronic addresses. The web-servers may be user-accessible so as to provide access to files posted to the electronic addresses. Access may be selectively granted to users based on a user authentication. The first user 101A and/or second user 101B may access the billing statements posted to the electronic addresses. The first user 101A and/or second user 101B may utilize one or more devices 108 (e.g. a personal computer), a user communications device 106A, a user communications device 106B, and the like, to access the electronic addresses. The one or more devices 108, the user communications device 106A, and/or the user communications device 106B may include an authentication user-interface (e.g. a keyboard for entering a password, a fingerprint scanner, a retinal scanner, a voice-print scanner, and the like) whereby the first user 101A and/or second user 101B may authenticate their identity. Upon identity authentication, the first user 101A and/or second user 101B may be allowed to view the billing statements.

Figure 6:
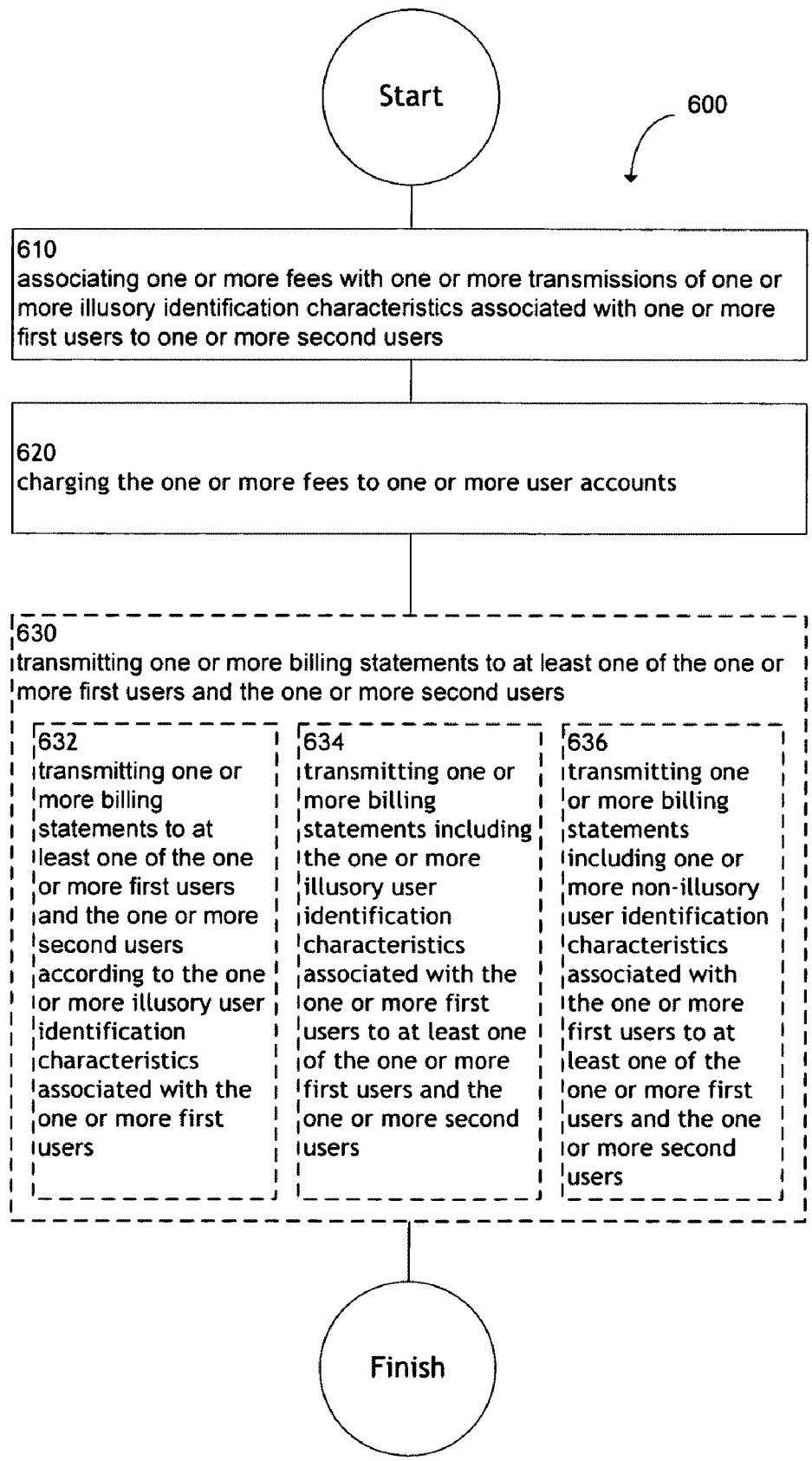
FIG. 6 is a high-level logic flowchart of a process.

FIG. 6 illustrates an operational flow 600 representing example operations related to authenticating a user identity. Operations 610 and 620 of operational flow 600 may be similar to those of operations 210 and 220 respectively, as referenced above with respect operational flow 200. Additional operations may include an operation 630, an operation 632, an operation 634 and/or an operation 636.

The operation 630 illustrates transmitting one or more billing statements to at least one of the one or more first users and the one or more second users. For example, as shown in FIG. 1, communications data transceiver module 102 of the carrier/service provider server 100 may transmit a billing statement to the first user 101A and/or second user 101B. The billing statements may be transmitted via numerous mechanisms. The billing statements may be transmitted via communications network 113 to an e-mail account, a text messaging system, an instant messaging system associated with the first user 101A and/or second user 101B or a website accessible by the first user 101A and/or second user 101B. The billing statements may be transmitted to the first user 101A and/or second user 101B via user communications device 106A and/or user communications device 106B for direct viewing on user interface 106-3A and/or user interface 106-3B.

The operation 632 illustrates transmitting one or more billing statements to at least one of the one or more first users and the one or more second users according to the one or more illusory user identification characteristics associated with the one or more first users. For example, as shown in FIG. 1, communications data transceiver module 102 of the carrier/service provider server 100 may transmit a billing statement to the first user 101A and/or second user 101B. The billing statement may be transmitted according to transmission of one or more of illusory ID data 105-2A, illusory ID data 105-2A', and illusory ID data 105-2A" to the second user 101B. For example, the billing statement may be transmitted to a first e-mail account when a fee has been charged for transmission of illusory ID data 105-2A to the second user 101B and transmitted to a second e-mail account when a fee has been charged for transmission of illusory ID data 105-2A' to the second user 101B.

The operation 634 illustrates transmitting one or more billing statements including the one or more illusory user identification characteristics associated with the one or more first users to at least one of the one or more first users and the one or more second users. For example, as shown in FIG. 1, communications data transceiver module 102 of the carrier/service provider server 100 may transmit a billing statement to the first user 101A and/or second user 101B. The billing statement may include references to illusory ID data 105-2A in place of non-illusory ID data 105-1A for communications in which illusory ID data 105-2A has been provided to first user 101A and/or second user 101B.

The operation 636 illustrates transmitting one or more billing statements including one or more non-illusory user identification characteristics associated with the one or more first users to at least one of the one or more first users and the one or more second users. For example, as shown in FIG. 1, communications data transceiver module 102 of the carrier/service provider server 100 may transmit a billing statement to the first user 101A and/or second user 101B. The billing statement may include references to non-illusory ID data 105-1A for communications in which illusory ID data 105-2A has been provided to first user 101A and/or second user 101B upon authentication of a user identity of the first user 101A and/or second user 101B. For example, at least one of the first user 101A and/or second user 101B may access the billing statement through a website. An initial view of the billing statement may include references to illusory ID data 105-2A in place of non-illusory ID data 105-1A for communications in which illusory ID data 105-2A was provided to second user 101B. Upon an identity authentication (e.g. a password input, a fingerprint scan, a retinal scan, a voice-print scan, and the like), a secondary view of the billing statement may be provided which may include references to non-illusory ID data 105-1A for communications in which the illusory ID data 105-2A was provided to second user 101B.

Figure 7:
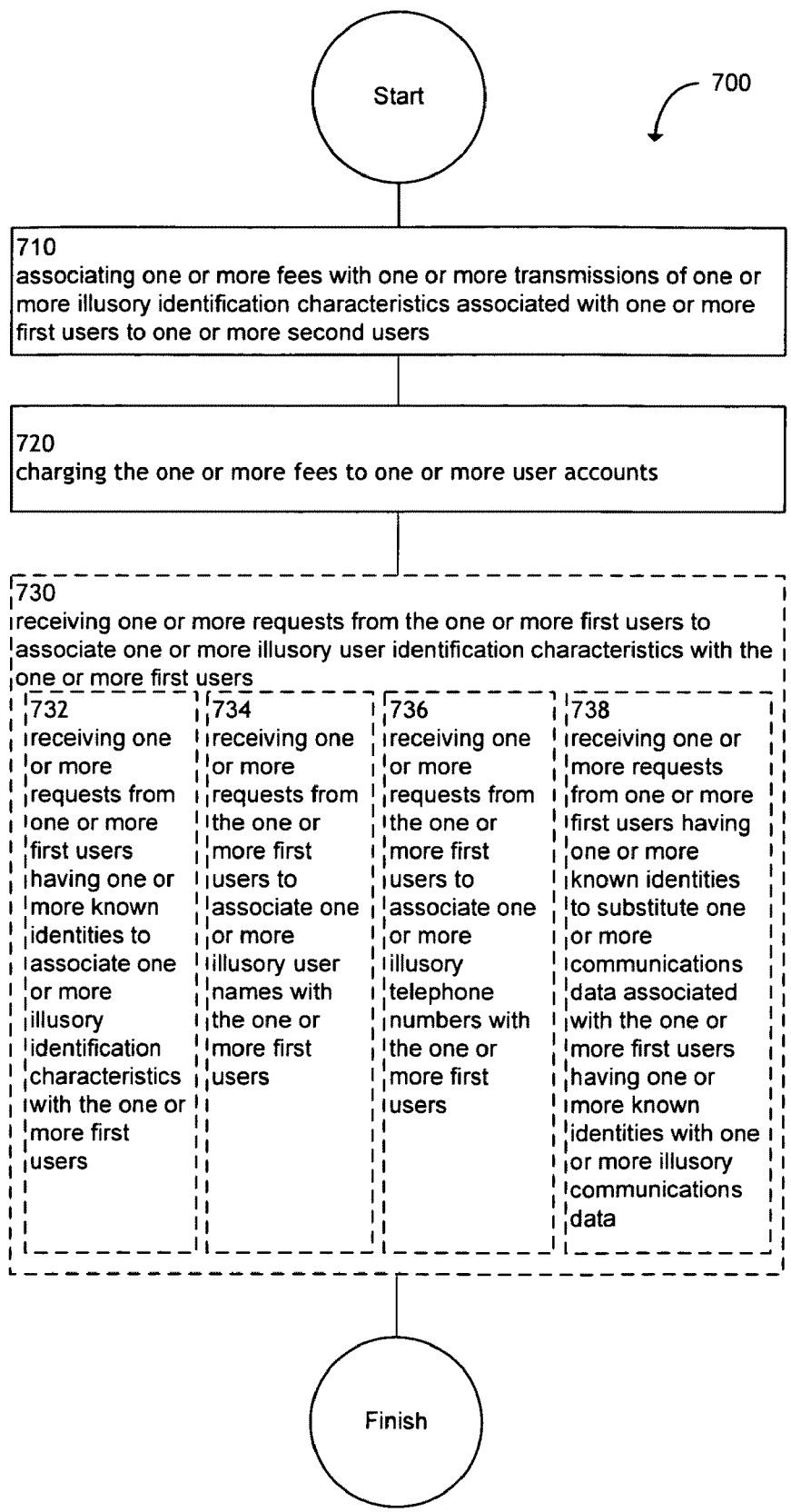
FIG. 7 is a high-level logic flowchart of a process.

FIG. 7 illustrates an operational flow 700 representing example operations related to authenticating a user identity. Operations 710 and 720 of operational flow 700 may be similar to those of operations 210 and 220 respectively, as referenced above with respect operational flow 200. Additional operations may include an operation 730, an operation 732, an operation 734, an operation 736 and/or an operation 738.

Operation 730 depicts receiving one or more requests from the one or more first users to associate one or more illusory user identification characteristics with the one or more first users. For example, as shown in FIG. 1, the communications data transceiver module 102 of the carrier/service provider server 100 may receive a request by a first user 101A made from a user communications device 106A to associate one or more illusory user identification characteristics (e.g. a characteristic which does not correspond to a user's actual characteristic) with the first user 101A. The first user 101A may provide an input through a user interface 106-3A of user communications device 106A whereby the first user 101A requests that the carrier/service provider server 100 associate an illusory identification characteristic represented by illusory ID data 105-2A be associated with first user 101A. The communications module 106-2B of the user communications device 106A may transmit data 110A representing the request which may be received by the communications data transceiver module 102 of the carrier/service provider server 100. The user-ID management logic 103-1 of the processor 103 may cause the memory 104 to store data 110A representing one or more illusory user identification characteristics to a portion of user-ID database 105 associated with a user (e.g. illusory ID data 105-2) in order to associate the illusory user identification characteristic with the user.

The operation 732 illustrates receiving one or more requests from one or more first users having one or more known identities to associate one or more illusory identification characteristics with the one or more first users. For example, as shown in FIG. 1, the carrier/service provider server 100 may receive a request to associate one or more illusory identification characteristics from a user 101A having an existing user-ID database 105 file (e.g. user A data 105A). Alternately, the carrier/service provider server 100 may receive a request to associate one or more illusory identification characteristics from a user 101A via a user communications device 106A recognized by the carrier/service provider server 100 as belonging to a database of devices associated with known users.

The operation 734 illustrates receiving one or more requests from the one or more first users to associate one or more illusory user names with the one or more first users. For example, as shown in FIG. 1, the carrier/service provider server 100 may receive a request from first user 101A to associate an illusory user name maintained as illusory ID data 105-2A associated with first user 101A. The associated illusory user name may be provided as part of data 110B transmitted to second user 101B by the carrier/service provider server 100 so as to disguise the user name of first user 101A.

The operation 736 illustrates receiving one or more requests from the one or more first users to associate one or more illusory telephone numbers with the one or more first users. For example, as shown in FIG. 1, the carrier/service provider server 100 may receive a request from first user 101A to associate an illusory user telephone number maintained as illusory ID data 105-2A associated with first user 101A. The associated illusory user telephone number may be provided as part of data 110B transmitted to second user 101B by the carrier/service provider server 100 so as to disguise the user telephone number of first user 101A.

Operation 738 illustrates receiving one or more requests from one or more first users having one or more known identities to substitute one or more communications data associated with the one or more first users having one or more known identities with one or more illusory communications data. For example, as shown in FIG. 1, the carrier/service provider server 100 may receive a request from first user 101A to substitute communications data (e.g. voice call data, e-mail data, text message data, VoIP data) provided to the to the carrier/service provider server 100 by a known first user 101A with illusory communications data.

Figure 8:
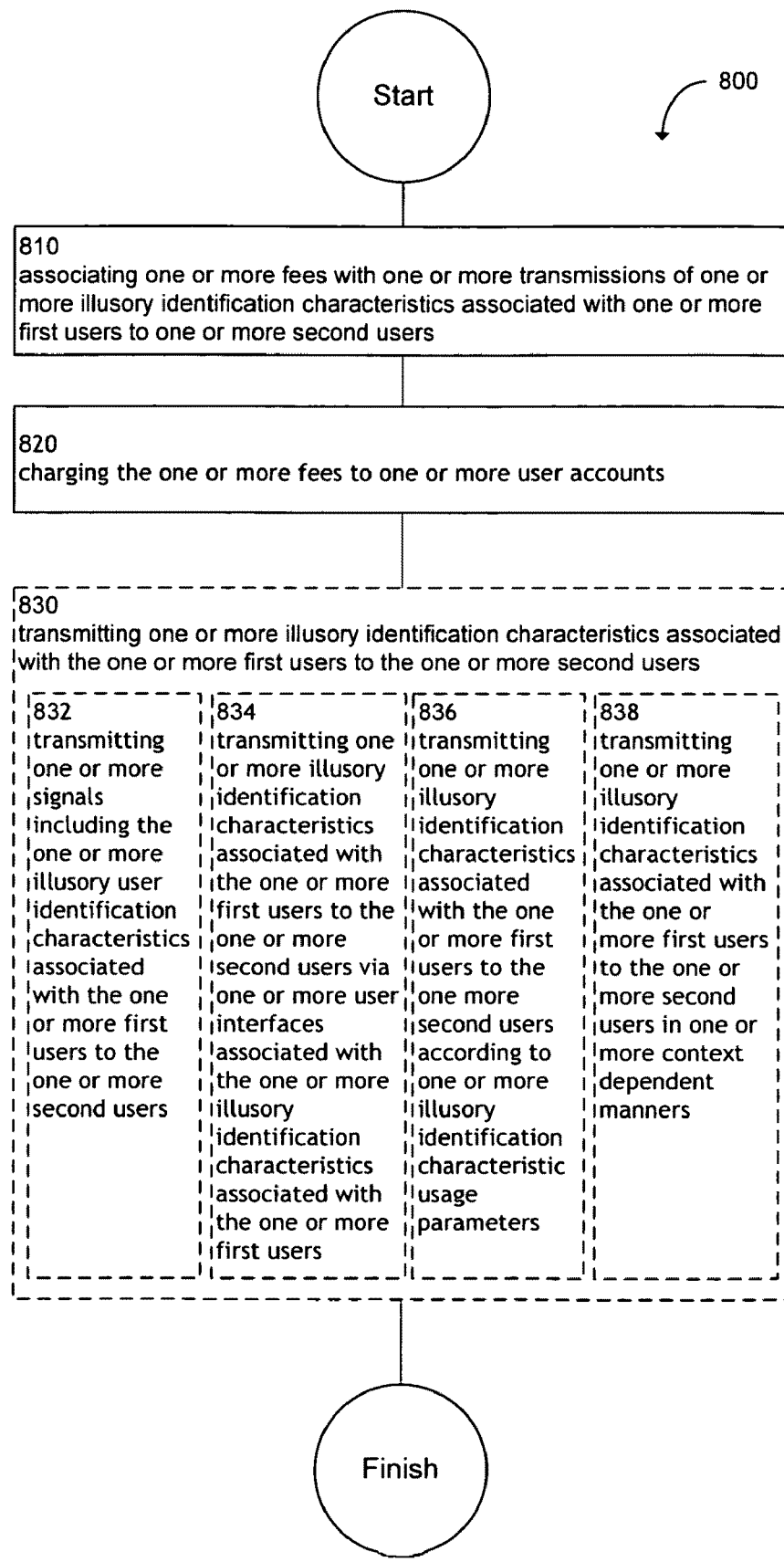
FIG. 8 is a high-level logic flowchart of a process.

FIG. 8 illustrates an operational flow 800 representing example operations related to authenticating a user identity. Operations 810 and 820 of operational flow 800 may be similar to those of operations 210 and 220 respectively, as referenced above with respect operational flow 200. Additional operations may include an operation 830, an operation 832, an operation 834, an operation 836 and/or an operation 838.

Operation 830 depicts transmitting one or more illusory identification characteristics associated with the one or more first users to the one or more second users. For example, as shown in FIG. 1, the communications data transceiver module 102 of the carrier/service provider server 100 may transmit data 110B including illusory ID data 105-2A associated with first user 101A to a user communications device 106B associated with second user 101B. The illusory ID data 105-2A may be received by a communications module 106-2B of the user communications device 106B and presented to the second user 101B via the user interface 106-3B of the user communications device 106B. The communications data transceiver module 102 may transmit data 110B in any number of communications data formats including, but not limited to a voice call (e.g. a landline or wireless phone call), a text message, an e-mail or a VoIP call.

The operation 832 illustrates transmitting one or more signals including one or more illusory user identification characteristics associated with the one or more first users to the one or more second users. For example, as shown in FIG. 1, the communications data transceiver module 102 of the carrier/service provider server 100 may transmit data 110B as signals (e.g. electrical signals, radio frequency signals, and the like) including illusory ID data 105-2A associated with first user 101A to a user communications device 106B associated with second user 101B. The signals including the illusory ID data 105-2A may be received by a communications module 106-2B of the user communications device 106B and presented to the second user 101B via the user interface 106-3B of the user communications device 106B. The communications data transceiver module 102 may transmit signals for any number of communications purposes including, but not limited to a voice calls (e.g. a landline or wireless phone call), a text messages, an e-mails or a VoIP calls.

The operation 834 illustrates transmitting one or more illusory identification characteristics associated with the one or more first users to the one or more second users via one or more user interfaces associated with the one or more illusory identification characteristics associated with the one or more first users. For example, as shown in FIG. 1, the communications data transceiver module 102 of the carrier/service provider server 100 may transmit data 110B including illusory ID data 105-2A associated with first user 101A to a user communications device 106B associated with second user 101B. The data 110B may further include user interface instructions which may cause user communications device 106B to present a particular user interface 106-3B to second user 101B according to the illusory ID data 105-2. The user interface 106-3B may include various displayed images and/or tones, user input options, and the like, which are associated with illusory ID data 105-2. For example, when illusory ID data 105-2A is transmitted to second user 101B, a password prompt may be provided to the second user 101B. Alternately, when illusory ID data 105-2A' is transmitted to second user 101B, no prompt may be provided to the second user 101B.

The operation 836 illustrates transmitting one or more illusory identification characteristics associated with the one or more first users to the one or more second users according to one or more illusory identification characteristic usage parameters. For example, as shown in FIG. 1, the communications data transceiver module 102 of the carrier/service provider server 100 may transmit data 110B including illusory ID data 105-2A associated with first user 101A to a user communications device 106B associated with second user 101B according to an illusory identification characteristic usage parameter (e.g. a location parameter, a time parameter, a proximity parameter). An illusory identification characteristic usage parameter may control the manner in which the illusory ID data 105-2A is provided to second user 101B (e.g. the illusory ID data 105-2A may only be transmitted to second user 101B at certain times of the day while non-illusory ID data 105-1A may be transmitted to second user 101B at other times of the day).

The operation 838 illustrates transmitting one or more illusory identification characteristics associated with the one or more first users to the one or more second users in one or more context dependent manners. For example, as shown in FIG. 1, the communications data transceiver module 102 of the carrier/service provider server 100 may transmit data 110B including illusory ID data 105-2A associated with first user 101A to a user communications device 106B associated with second user 101B according to a context (e.g. a location of second user 101B, a proximity of a third party 101C to second user 101B, and the like) of at least one of the second user 101B and the second user 101B.

Figure 9:
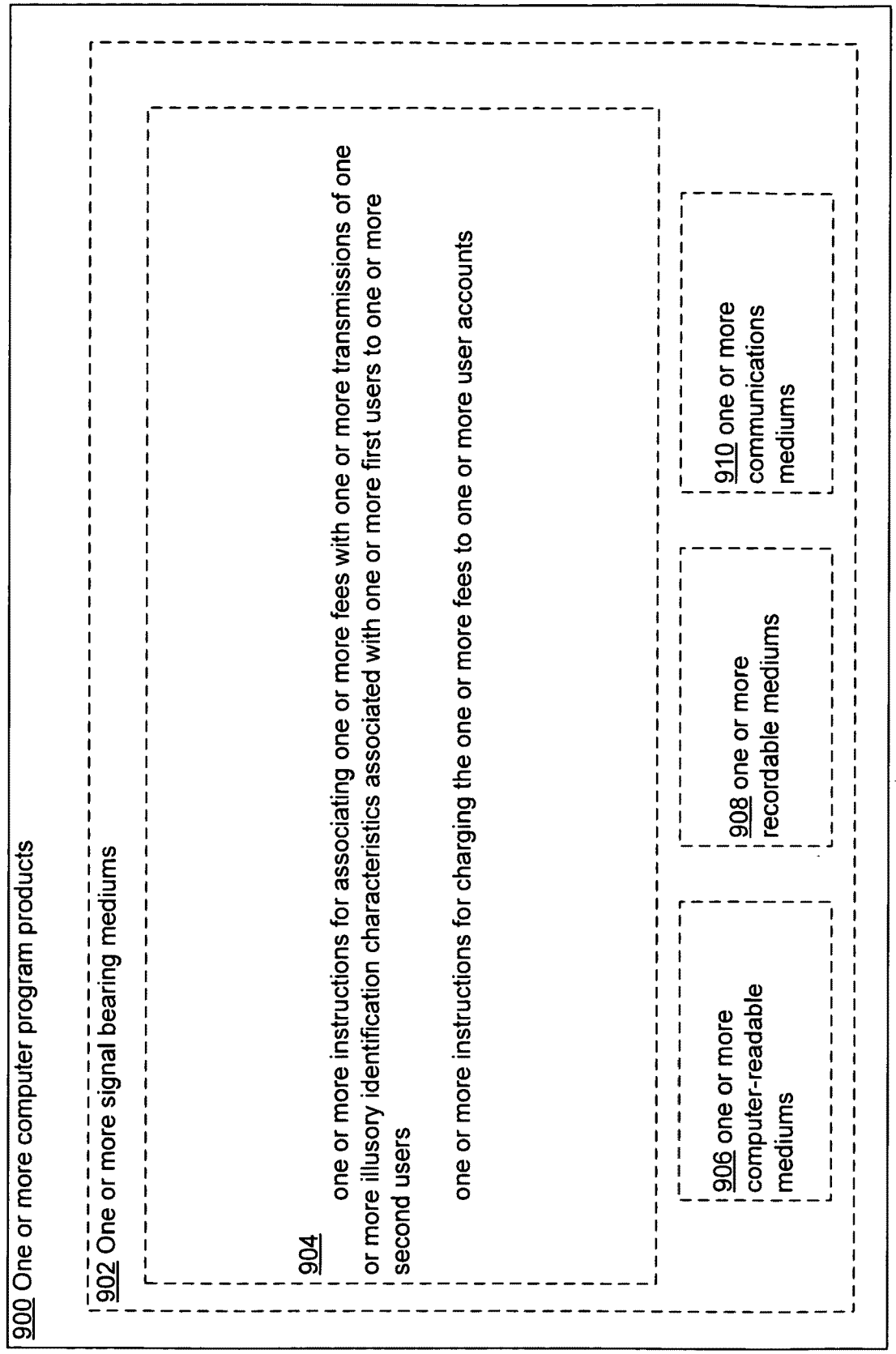
FIG. 9 shows a high-level block diagram of a computer program product.

FIG. 9 illustrates a partial view of an example computer program product 900 that includes a computer program 904 for executing a computer process on a computing device. An embodiment of the example computer program product 900 is provided using a signal-bearing medium 902, and may include one or more instructions for associating one or more fees with a transmission of one or more illusory identification characteristics associated with one or more first users to one or more second users; and one or more instructions for charging the one or more fees to one or more user accounts. The one or more instructions may be, for example, computer executable and/or logic-implemented instructions. In one implementation, the signal-bearing medium 902 may include a computer-readable medium 906. In one implementation, the signal bearing medium 902 may include a recordable medium 908. In one implementation, the signal bearing medium 902 may include a communications medium 910.

Figure 10:
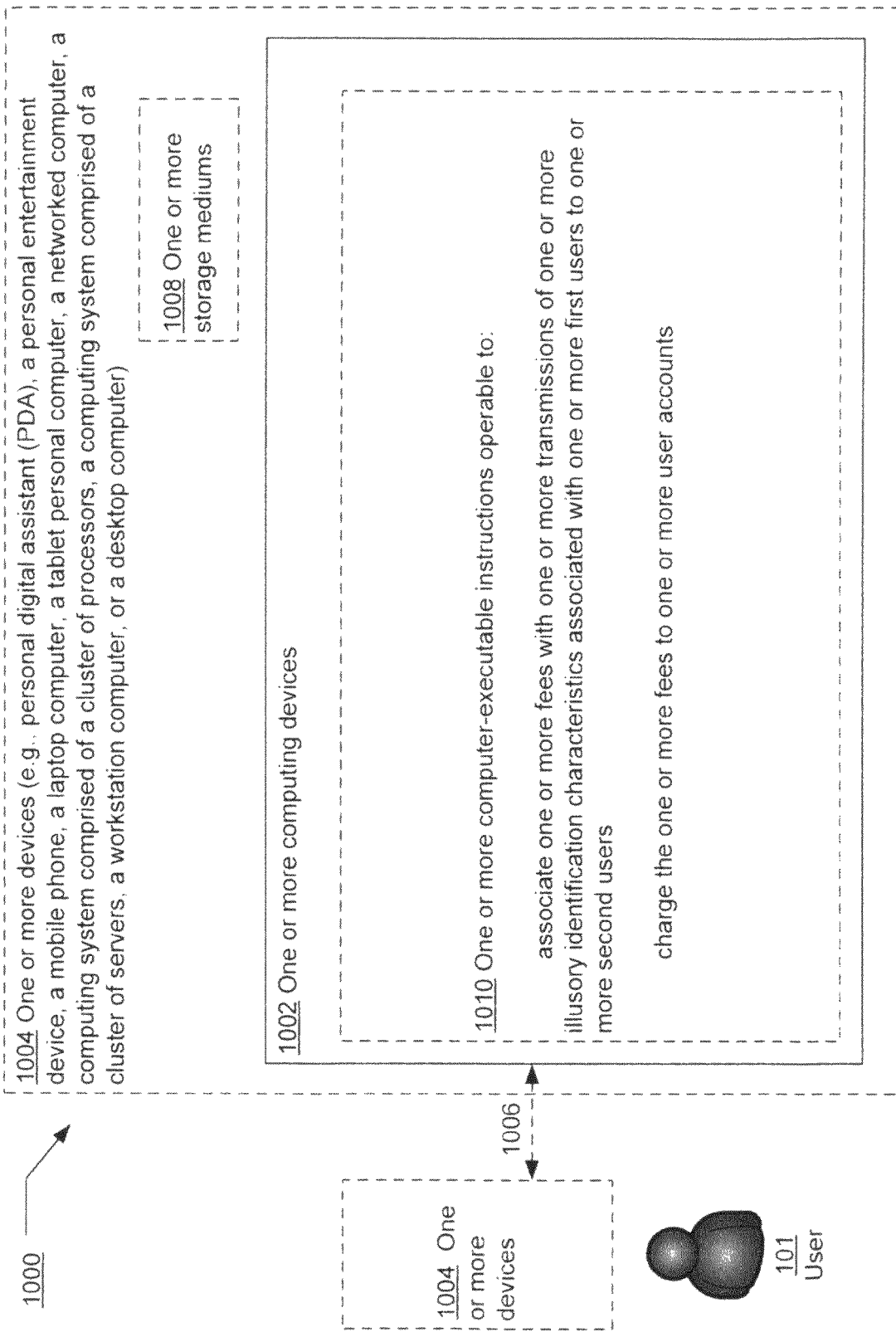
FIG. 10 shows a high-level block diagram of a system for providing illusory identification characteristics.

FIG. 10 illustrates an example system 1000 in which embodiments may be implemented. The system 1000 includes a computing system environment. The system 1000 also illustrates the user 101 using a device 1004, which is optionally shown as being in communication with a computing device 1002 by way of an optional coupling 1006. The optional coupling 1006 may represent a local, wide-area, or peer-to-peer network, or may represent a bus that is internal to a computing device (e.g., in example embodiments in which the computing device 1002 is contained in whole or in part within the device 1004). A storage medium 1008 may be any computer storage media.

The computing device 1002 includes computer-executable instructions 1010 that when executed on the computing device 1002 cause the computing device 1002 to associate one or more fees with a transmission of one or more illusory identification characteristics associated with a first user to a second user; and charge the one or more fees to one or more user accounts. As referenced above and as shown in FIG. 10, in some examples, the computing device 1002 may optionally be contained in whole or in part within the device 1004.

In FIG. 10, the system 1000 includes at least one computing device (e.g., 1002 and/or 1004). The computer-executable instructions 1010 may be executed on one or more of the at least one computing device. For example, the computing device 1002 may implement the computer-executable instructions 1010 and output a result to (and/or receive data from) the computing device 1002. Since the computing device 1002 may be wholly or partially contained within the device 1004, the device 1004 also may be said to execute some or all of the computer-executable instructions 1010, in order to be caused to perform or implement, for example, various ones of the techniques described herein, or other techniques.

The device 1004 may include, for example, a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer. In another example embodiment, the computing device 1002 is operable to communicate with the device 1004 associated with the user 101 to receive information about the input from the user 101 for performing data access and data processing and presenting an output of the user-health test function at least partly based on the user data.

Further, the device 1004 may include a heterogeneous computing network including two or more of a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer, operably coupled to a common computing network.

Although a user 101 is shown/described herein as a single illustrated figure, those skilled in the art will appreciate that a user 101 may be representative of a human user, a robotic user (e.g., computational entity), and/or substantially any combination thereof (e.g., a user may be assisted by one or more robotic agents). In addition, a user 101, as set forth herein, although shown as a single entity may in fact be composed of two or more entities. Those skilled in the art will appreciate that, in general, the same may be said of "sender" and/or other entity-oriented terms as such terms are used herein.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.).

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies.

What is claimed is:

1. A method comprising:
  associating, by a server system, one or more fees with a transmission of one or more illusory identification characteristics associated with one or more first users to one or more second users;
  charging, by the server system, the one or more fees to one or more user accounts; and
  transmitting, by the server system, one or more billing statements to at least one of the one or more first users and the one or more second users, wherein said transmitting, by the server system, one or more billing statements to at least one of the one or more first users and the one or more second users further comprises:
    transmitting one or more billing statements to at least one of the one or more first users and the one or more second users according to the one or more illusory user identification characteristics associated with the one or more first users, wherein said transmitting one or more billing statements to at least one of the one or more first users and the one or more second users according to the one or more illusory user identification characteristics associated with the one or more first users further comprises:
      transmitting one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users.

2. The method of claim 1, wherein the transmitting one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users comprises:

transmitting the one or more billing statements including the one or more illusory user identification characteristics to the one or more second users.

3. The method of claim 1, further comprising:

transmitting, by the server system, one or more illusory identification characteristics associated with the one or more first users to the one or more second users, wherein the transmitting, by the server system, one or more illusory identification characteristics associated with the one or more first users to the one or more second users comprises:

transmitting one or more illusory identification characteristics associated with the one or more first users to the one or more second users in one or more context dependent manners.

4. The method of claim 3, wherein the transmitting one or more illusory identification characteristics associated with the one or more first users to the one or more second users in one or more context dependent manners further comprising:

transmitting the one or more illusory identification characteristics associated with the one or more first users to the one or more second users, the transmitting of the one or more illusory identification characteristics associated with the one or more first users to the one or more second users being dependent on location of the second user.

5. The method of claim 3, wherein the transmitting one or more illusory identification characteristics associated with the one or more first users to the one or more second users in one or more context dependent manners further comprising:

transmitting the one or more illusory identification characteristics associated with the one or more first users to the one or more second users the transmitting of the one or more illusory identification characteristics associated with the one or more first users to the one or more second users being dependent on proximity of a third party to the second user.

6. A system comprising:

means for associating one or more fees with a transmission of one or more illusory identification characteristics associated with one or more first users to one or more second users;

means for charging the one or more fees to one or more user accounts; and means for transmitting one or more billing statements to at least one of the one or more first users and the one or more second users, wherein said means for transmitting one or more billing statements to at least one of the one or more first users and the one or more second users further comprises:

means for transmitting one or more billing statements to at least one of the one or more first users and the one or more second users according to the one or more illusory user identification characteristics associated with the one or more first users, wherein said means for transmitting one or more billing statements to at least one of the one or more first users and the one or more second users according to the one or more illusory user identification characteristics associated with the one or more first users further comprises:

means for transmitting one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users.

7. The system of claim 6, wherein the means for associating one or more fees with a transmission of one or more illusory identification characteristics associated with one or more first users to one or more second users comprises:

means for associating one or more fees with one or more transmissions of one or more illusory user names associated with the one or more first users to the one or more second users.

8. The system of claim 6, wherein the means for associating one or more fees with a transmission of one or more illusory identification characteristics associated with one or more first users to one or more second users comprises:

means for associating one or more fees with one or more transmissions of one or more illusory user identification numbers associated with the one or more first users to the one or more second users.

9. The system of claim 6, wherein the means for associating one or more fees with a transmission of one or more illusory identification characteristics associated with one or more first users to one or more second users comprises:

means for associating one or more fees with one or more transmissions of one or more illusory telephone numbers associated with the one or more first users to the one or more second users.

10. The system of claim 6, wherein the means for associating one or more fees with a transmission of one or more illusory identification characteristics associated with one or more first users to one or more second users comprises:

means for associating one or more fees with one or more transmissions of one or more illusory area codes associated with the one or more first users to the one or more second users.

11. The system of claim 6, wherein the means for associating one or more fees with a transmission of one or more illusory identification characteristics associated with one or more first users to one or more second users comprises:

means for associating one or more fees with one or more transmissions of one or more illusory voice signatures associated with the one or more first users to the one or more second users.

12. The system of claim 6, wherein the means for charging the one or more fees to one or more user accounts further comprises:

means for charging the one or more fees to one or more prepaid accounts.

13. The system of claim 6, wherein the means for charging the one or more fees to one or more user accounts further comprises:

means for charging the one or more fees to one or more banking accounts.

14. The system of claim 6, wherein the means for charging the one or more fees to one or more user accounts further comprises:

means for charging the one or more fees to one or more credit accounts.

15. The system of claim 6, wherein the means for charging the one or more fees to one or more user accounts further comprises:
    means for charging the one or more fees to one or more subscription accounts.

16. The system of claim 6, wherein the means for charging the one or more fees to one or more user accounts comprises:
    means for charging the one or more fees to one or more financial accounts at one or more rate structures.

17. The system of claim 6, wherein the means for transmitting one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users comprises:
    means for transmitting the one or more billing statements including the one or more illusory user identification characteristics to the one or more second users.

18. The system of claim 6, wherein the means for transmitting one or more billing statements to at least one of the one or more first users and the one or more second users according to the one or more illusory user identification characteristics associated with the one or more first users further comprises:
    means for transmitting one or more billing statements including one or more non-illusory user identification characteristics associated with the one or more first users to at least one of the one or more first users and the one or more second users in response to identification authentication.

19. The system of claim 9, further comprising:
    means for receiving one or more requests from the one or more first users to associate one or more illusory user identification characteristics with the one or more first users.

20. The system of claim 19, wherein the means for receiving one or more requests from the one or more first users to associate one or more illusory user identification characteristics with the one or more first users comprises:
    means for receiving one or more requests from one or more first users having one or more known identities to associate one or more illusory identification characteristics with the one or more first users.

21. The system of claim 19, wherein the means for receiving one or more requests from the one or more first users to associate one or more illusory user identification characteristics with the one or more first users comprises:
    means for receiving one or more requests from the one or more first users to associate one or more illusory user names with the one or more first users.

22. The system of claim 19, wherein the means for receiving one or more requests from the one or more first users to associate one or more illusory user identification characteristics with the one or more first users comprises:
    means for receiving one or more requests from the one or more first users to associate one or more illusory telephone numbers with the one or more first users.

23. The system of claim 19, wherein the means for receiving one or more requests from the one or more first users to associate one or more illusory user identification characteristics with the one or more first users further comprises:
    means for receiving one or more requests from one or more first users having one or more known identities to substitute one or more communications data associated with the one or more first users having one or more known identities with one or more illusory communications data.

24. The system of claim 6, further comprising:
    means for transmitting one or more illusory identification characteristics associated with the one or more first users to the one or more second users.

25. The system of claim 24, wherein the means for transmitting one or more illusory identification characteristics associated with the one or more first users to the one or more second users comprises:
    means for transmitting one or more signals including one or more illusory user identification characteristics associated with the one or more first users to the one or more second users.

26. The system of claim 24, wherein the means for transmitting one or more illusory identification characteristics associated with the one or more first users to the one or more second users comprises:
    means for transmitting one or more illusory identification characteristics associated with the one or more first users to the one or more second users in one or more context dependent manners.

27. The system of claim 26, wherein the means for transmitting one or more illusory identification characteristics associated with the one or more first users to the one or more second users in one or more context dependent manners further comprises:
    means for transmitting the one or more illusory identification characteristics associated with the one or more first users to the one or more second users, the transmitting of the one or more illusory identification characteristics associated with the one or more first users to the one or more second users being dependent on location of the second user.

28. The system of claim 26, wherein the means for transmitting one or more illusory identification characteristics associated with the one or more first users to the one or more second users in one or more context dependent manners further comprises:
    means for transmitting the one or more illusory identification characteristics associated with the one or more first users to the one or more second users, the transmitting of the one or more illusory identification characteristics associated with the one or more first users to the one or more second users being dependent on proximity of a third party to the second user.

29. A system comprising:
    circuitry for associating one or more fees with a transmission of one or more illusory identification characteristics associated with one or more first users to one or more second users;
    circuitry for charging the one or more fees to one or more user accounts; and
    circuitry for transmitting one or more billing statements to at least one of the one or more first users and the one or more second users, wherein said circuitry for transmitting one or more billing statements to at least one of the one or more first users and the one or more second users further comprises:
        circuitry for transmitting one or more billing statements to at least one of the one or more first users and the one or more second users according to the one or more illusory user identification characteristics associated with the one or more first users, wherein said circuitry for transmitting one or more billing statements to at least one of the one or more first users and the one or more second users according to the one or more illusory user identification characteristics associated with the one or more first users further comprises:
  circuitry for transmitting one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users.

30. The system of claim 29, further comprising:
circuitry for posting one or more billing statements to one or more electronic addresses.

31. The system of claim 29, further comprising:
circuitry for transmitting one or more billing statements to at least one of the one or more first users and the one or more second users.

32. The system of claim 29, further comprising:
circuitry for receiving one or more requests from the one or more first users to associate one or more illusory user identification characteristics with the one or more first users.

33. The system of claim 29, further comprising:
circuitry for transmitting one or more illusory identification characteristics associated with the one or more first users to the one or more second users.

34. An article of manufacture comprising:
one or more non-transitory storage mediums bearing:
one or more instructions for associating one or more fees with a transmission of one or more illusory identification characteristics associated with one or more first users to one or more second users;
one or more instructions for charging the one or more fees to one or more user accounts; and
one or more instructions for transmitting one or more billing statements to at least one of the one or more first users and the one or more second users, wherein said one or more instructions for transmitting one or more billing statements to at least one of the one or more first users and the one or more second users further comprises:
  one or more instructions for transmitting one or more billing statements to at least one of the one or more first users and the one or more second users according to the one or more illusory user identification characteristics associated with the one or more first users, wherein said one or more instructions for transmitting one or more billing statements to at least one of the one or more first users and the one or more second users according to the one or more illusory user identification characteristics associated with the one or more first users further comprises:
    one or more instructions for transmitting one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users.

35. The article of manufacture of claim 34, wherein the one or more non-transitory storage mediums include one or more computer-readable mediums.

36. The article of manufacture of claim 34, wherein one or more non-transitory storage mediums include one or more recordable mediums.

37. The article of manufacture of claim 34, wherein the one or more non-transitory storage mediums include one or more communications mediums.

38. A system comprising:
one or more computing devices; and
one or more instructions that when executed on the one or more computing devices cause the one or more computing devices to
associate one or more fees with one or more transmissions of one or more illusory identification characteristics associated with one or more first users to one or more second users;
charge the one or more fees to one or more user accounts; and
transmit one or more billing statements to at least one of the one or more first users and the one or more second users, wherein said transmitting of the one or more billing statements to at least one of the one or more first users and the one or more second users further comprises:
  transmit one or more billing statements to at least one of the one or more first users and the one or more second users according to the one or more illusory user identification characteristics associated with the one or more first users, wherein said transmitting of the one or more billing statements to at least one of the one or more first users and the one or more second users according to the one or more illusory user identification characteristics associated with the one or more first users further comprises:
    transmit one or more billing statements including the one or more illusory user identification characteristics associated with the one or more first users to at least one of the one or more first users and the one or more second users, the one or more illusory user identification characteristics to be included in the one or more billing statements in place of all non-illusory user identification characteristics associated with the one or more first users in the one or more billing statements resulting in the one or more billing statements having no non-illusory user identification characteristics associated with the one or more first users.

39. The system of claim 38, wherein the one or more computing devices comprise:
one or more of a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer.

40. The system of claim 38, wherein the one or more computing devices comprise:
one or more heterogeneous computing networks.

41. The system of claim 40, wherein the one or more heterogeneous computing networks comprise:
two or more of a personal digital assistant (PDA), a personal entertainment device, a mobile phone, a laptop computer, a tablet personal computer, a networked computer, a computing system comprised of a cluster of processors, a computing system comprised of a cluster of servers, a workstation computer, or a desktop computer.

* * * * *

UNITED STATES PATENT AND TRADEMARK OFFICE
CERTIFICATE OF CORRECTION

PATENT NO.        : 8,224,907 B2                                Page 1 of 1
APPLICATION NO.   : 12/287268
DATED             : July 17, 2012
INVENTOR(S)       : Alexander J. Cohen et al.

It is certified that error appears in the above-identified patent and that said Letters Patent is hereby corrected as shown below:

In Col. 19, line 33 "users being dependent on location of the second user." should read
-- users being dependent on one or more locations of the one or more second users. --

In Col. 19, line 44 "the second user." should read -- the one or more second users. --

In Col. 21, line 39 "19. The system of claim 9, further comprising:" should read
-- 19. The system of claim 6, further comprising: --

In Col. 22, lines 39-40 "more second users being dependent on location of the second user." should
read -- more second users being dependent on one or more locations of the one or more second
users. --

In Col. 22, line 52 "third party to the second user." should read
-- third party to the one or more second users. --

Signed and Sealed this
Sixteenth Day of October, 2012

David J. Kappos
*Director of the United States Patent and Trademark Office*